United States Patent
Zhou et al.

(10) Patent No.: US 11,650,676 B2
(45) Date of Patent: May 16, 2023

(54) CONTROL METHOD FOR AUDIO DEVICE, AUDIO DEVICE AND STORAGE MEDIUM

(71) Applicant: GOERTEK INC., Weifang (CN)

(72) Inventors: Shumin Zhou, Weifang (CN); Li Ding, Weifang (CN); Haipeng Zhou, Weifang (CN); Xiaochen Wang, Weifang (CN); Ke Dong, Weifang (CN)

(73) Assignee: GOERTEK INC., Weifang (CN)

( * ) Notice: Subject to any disclaimer, the term of this patent is extended or adjusted under 35 U.S.C. 154(b) by 0 days.

(21) Appl. No.: 17/473,301

(22) Filed: Sep. 13, 2021

(65) Prior Publication Data
US 2021/0405774 A1    Dec. 30, 2021

Related U.S. Application Data

(63) Continuation of application No. PCT/CN2019/130641, filed on Dec. 31, 2019.

(30) Foreign Application Priority Data

Nov. 15, 2019    (CN) .......................... 201911126040.X

(51) Int. Cl.
  *G06F 3/0362*    (2013.01)
  *G06F 3/04847*   (2022.01)
  *G06F 3/0487*    (2013.01)

(52) U.S. Cl.
  CPC .......... *G06F 3/0362* (2013.01); *G06F 3/0487* (2013.01); *G06F 3/04847* (2013.01)

(58) Field of Classification Search
  CPC ... G06F 3/0362; G06F 3/04847; G06F 3/0487
  See application file for complete search history.

(56) References Cited

U.S. PATENT DOCUMENTS

| | | | |
|---|---|---|---|
| 2013/0328792 A1* | 12/2013 | Myers ................... | G06F 3/0487 345/173 |
| 2015/0077438 A1* | 3/2015 | Tamaki ................. | G04C 3/002 345/672 |

(Continued)

FOREIGN PATENT DOCUMENTS

| | | |
|---|---|---|
| CN | 101030982 A | 9/2007 |
| CN | 101813982 A | 8/2010 |

(Continued)

OTHER PUBLICATIONS

First Office Action in corresponding Chinese Application No. 201911126040 X; dated Aug. 17, 2020; 20 pgs.

(Continued)

*Primary Examiner* — Jennifer N Welch
*Assistant Examiner* — Reji Kartholy
(74) *Attorney, Agent, or Firm* — Hauptman Ham, LLP

(57) ABSTRACT

Disclosed is a control method for an audio device, the audio device includes a playing component and a display screen rotatably connected to the playing component, and the control method for the audio device includes the following steps: in response to detecting rotation of the display screen, acquiring a first rotation direction and a first rotation angle of the display screen in a preset three-dimensional coordinate system; determining a second rotation direction and a second rotation angle of display content on the display screen according to the first rotation direction and the first rotation angle, where the first rotation direction is opposite to the second rotation direction, and a difference between the second rotation angle and the first rotation angle is less than or equal to a preset value; and adjusting a display orientation of the display content according to the second rotation direction and the second rotation angle.

11 Claims, 6 Drawing Sheets

(56) References Cited

U.S. PATENT DOCUMENTS

| | | | | |
|---|---|---|---|---|
| 2015/0338211 | A1* | 11/2015 | Hu | G06V 10/42 |
| | | | | 348/135 |
| 2016/0055623 | A1* | 2/2016 | Li | G06F 1/1626 |
| | | | | 345/657 |
| 2016/0349799 | A1* | 12/2016 | Jiang | G06F 3/0346 |
| 2016/0364017 | A1 | 12/2016 | Wang | |
| 2017/0243327 | A1* | 8/2017 | Zhang | G06T 3/60 |
| 2018/0099220 | A1* | 4/2018 | Hayasaka | A63F 13/44 |
| 2018/0314415 | A1 | 11/2018 | Okamoto | |
| 2020/0285443 | A1* | 9/2020 | Yuan | H04N 7/142 |

FOREIGN PATENT DOCUMENTS

| | | |
|---|---|---|
| CN | 102789322 A | 11/2012 |
| CN | 104461335 A | 3/2015 |
| CN | 104820562 A | 8/2015 |
| CN | 105260108 A | 1/2016 |
| CN | 106095372 A | 11/2016 |
| CN | 107249159 A | 10/2017 |
| CN | 208063451 A | 11/2018 |
| CN | 109327763 A | 2/2019 |
| CN | 109460074 A | 3/2019 |
| CN | 109547650 A | 3/2019 |
| CN | 208707863 U | 4/2019 |
| CN | 208987166 U | 6/2019 |
| CN | 110442295 A | 11/2019 |
| WO | 2018204811 A1 | 11/2018 |

OTHER PUBLICATIONS

Second Office Action in corresponding Chinese Application No. 201911126040.X; dated Feb. 3, 2021; 14 pgs.

International Search Report and Written Opinion issued in corresponding International Application No. PCT/CN2019/130641; dated Jul. 28, 2020; China National Intellectual Administration, Beijing, China, 13 pgs.

* cited by examiner

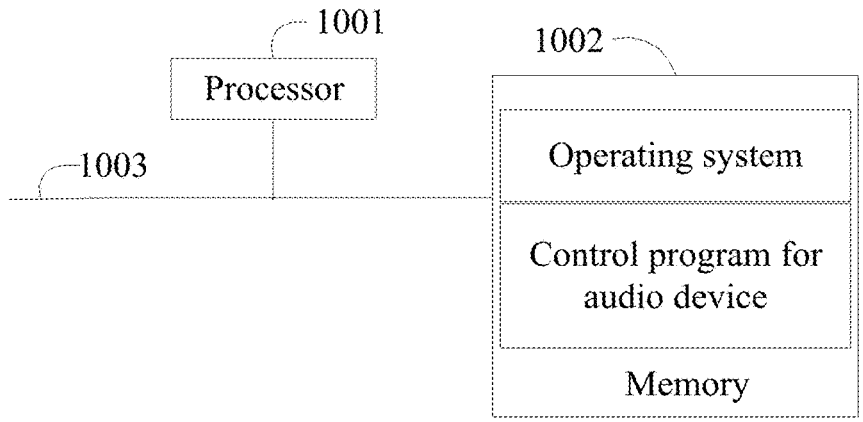

FIG. 1

In response to detecting rotation of the display screen, acquiring a first rotation direction and a first rotation angle of the display screen in a preset three-dimensional coordinate system — S10

Determining a second rotation direction and a second rotation angle of display content on the display screen according to the first rotation direction and the first rotation angle, the first rotation direction is opposite to the second rotation direction, and a difference between the second rotation angle and the first rotation angle is less than or equal to a preset value — S20

Adjusting a display orientation of the display content according to the second rotation direction and the second rotation angle — S30

FIG. 2

In response to detecting rotation of the display screen, regularly performing the step of acquiring a first rotation direction and a first rotation angle of the display screen in a preset three-dimensional coordinate system — S40

Determining a second rotation direction and a second rotation angle of display content on the display screen according to the first rotation direction and the first rotation angle, the first rotation direction is opposite to the second rotation direction, and a difference between the second rotation angle and the first rotation angle is less than or equal to a preset value — S20

Adjusting a display orientation of the display content according to the second rotation direction and the second rotation angle — S30

FIG. 3

CONTROL METHOD FOR AUDIO DEVICE, AUDIO DEVICE AND STORAGE MEDIUM

CROSS REFERENCE TO RELATED APPLICATIONS

This disclosure is a Continuation Application of International Application No. PCT/CN2019/130641, filed on Dec. 31, 2019, which claims the priority to Chinese Patent Application No. 201911126040.X, entitled "Control method for audio device, audio device and storage medium", submitted to the China National Intellectual Property Administration on Nov. 15, 2019, which is hereby incorporated by reference in its entirety.

TECHNICAL FIELD

This disclosure relates to the technical field of audio devices, in particular to a control method for an audio device, an audio device and a computer-readable storage medium.

BACKGROUND

With the emergence of smart loudspeakers with display screens, smart loudspeakers meet the diversified human-computer interaction needs of users through all-in-one interaction methods such as hearing, vision, and touch. However, at present, the display content of the screen of the smart loudspeaker is displayed at a fixed angle. When the screen rotates, the information will rotate in the same direction, or when the screen rotates to a certain angle, the content displayed on the screen directly rotates 90 degrees, so that the display content cannot always focus on the user, which is not convenient for the user to watch the content displayed on the screen when the screen rotates.

The above content is only used to assist the understanding of the technical solution of this disclosure, and does not mean that the above content is recognized as the prior art.

SUMMARY

The main object of this disclosure is to provide a control method for an audio device, an audio device and a computer-readable storage medium, so as to facilitate the user to view the display content when the display screen of the audio device rotates.

In order to achieve the above object, this disclosure provides a control method for an audio device, the audio device includes a playing component and a display screen rotatably connected to the playing component, and the control method for the audio device includes the following steps:

in response to detecting rotation of the display screen, acquiring a first rotation direction and a first rotation angle of the display screen in a preset three-dimensional coordinate system;

determining a second rotation direction and a second rotation angle of display content on the display screen according to the first rotation direction and the first rotation angle, the first rotation direction is opposite to the second rotation direction, and a difference between the second rotation angle and the first rotation angle is less than or equal to a preset value; and adjusting a display orientation of the display content according to the second rotation direction and the second rotation angle.

Optionally, the playing component is rotatably connected to the display screen through a rotating shaft, and before the step of in response to detecting rotation of the display screen, acquiring a first rotation direction and a first rotation angle of the display screen in a preset three-dimensional coordinate system, the control method for the audio device further includes:

determining a reference point of the display screen;

acquiring and taking a coordinate of the rotating shaft in the preset three-dimensional coordinate system as a first coordinate, acquiring and taking a coordinate of the reference point in the preset three-dimensional coordinate system before the display screen rotates as a second coordinate, and acquiring and taking a coordinate of the reference point in the preset three-dimensional coordinate system after the display screen rotates as a third coordinate; and taking a connection line between the first coordinate and the second coordinate as a first connection line, taking a connection line between the first coordinate and the third coordinate as a second connection line, and taking an included angle between the first connection line and the second connection line as the first rotation angle.

Optionally, the control method for the audio device further includes:

in response to detecting rotation of the display screen, determining the first rotation direction according to an offset direction of the second connection line relative to the first connection line.

Optionally, the control method for the audio device further includes:

in response to detecting rotation of the display screen, regularly performing the step of acquiring a first rotation direction and a first rotation angle of the display screen in a preset three-dimensional coordinate system.

Optionally, the control method for the audio device further includes:

in response to receiving a rotation instruction of the display screen, acquiring an initial position corresponding to the display screen before execution of the rotation instruction, and acquiring a target rotation position corresponding to the display screen after completion of the rotation instruction;

determining at least two detection intervals according to a position interval formed between the target rotation position and the initial position;

in response to detecting rotation of the display screen, acquiring a position of the display screen; and in a determination that the position of the display screen reaches one of the at least two detection intervals, performing the step of acquiring a first rotation direction and a first rotation angle of the display screen in a preset three-dimensional coordinate system.

Optionally, the at least two detection intervals include a first detection interval, a second detection interval and a third detection interval, and the display screen is controlled to perform uniform acceleration rotation in the first detection interval, perform uniform rotation in the second detection interval, and perform uniform deceleration rotation in the third detection interval.

Optionally, when performing the step of adjusting a display orientation of the display content according to the second rotation direction and the second rotation angle, controlling a display ratio of the display content on the display screen to remain unchanged.

Optionally, a display interface of the display screen is a circular display interface.

In order to achieve the above object, this disclosure further provides an audio device, the audio device includes a playing component and a display screen rotatably connected to the playing component, and the audio device includes:

a memory, a processor, and a control program for the audio device stored on the memory and operable on the processor, and when the control program for the audio device is executed by the processor, the steps of the control method for the audio device as described above are implemented.

In order to achieve the above object, this disclosure further provides a computer-readable storage medium, a control program for an audio device is stored thereon, and when the control program for the audio device is executed by a processor, the steps of the control method for the audio device as described above are implemented.

This disclosure provides a control method for an audio device, audio device and computer-readable storage medium. In response to detecting rotation of the display screen, a first rotation direction and a first rotation angle of the display screen in a preset three-dimensional coordinate system are acquired; a second rotation direction and a second rotation angle of display content on the display screen are determined according to the first rotation direction and the first rotation angle, the first rotation direction is opposite to the second rotation direction, and a difference between the second rotation angle and the first rotation angle is less than or equal to a preset value; and a display orientation of the display content is adjusted according to the second rotation direction and the second rotation angle. In this way, the display orientation of the display content relative to the display screen is kept unchanged when the display screen of the audio device rotates, so that the display content is facing the user when the user is viewing the display content facing the display screen.

BRIEF DESCRIPTION OF THE DRAWINGS

FIG. 1 is a schematic diagram of a hardware operating environment of a terminal according to an embodiment of this disclosure.

FIG. 2 is a flow chart of a first embodiment of a control method for an audio device according to this disclosure.

FIG. 3 is a flow chart of a second embodiment of the control method for the audio device according to this disclosure.

Figure 4:
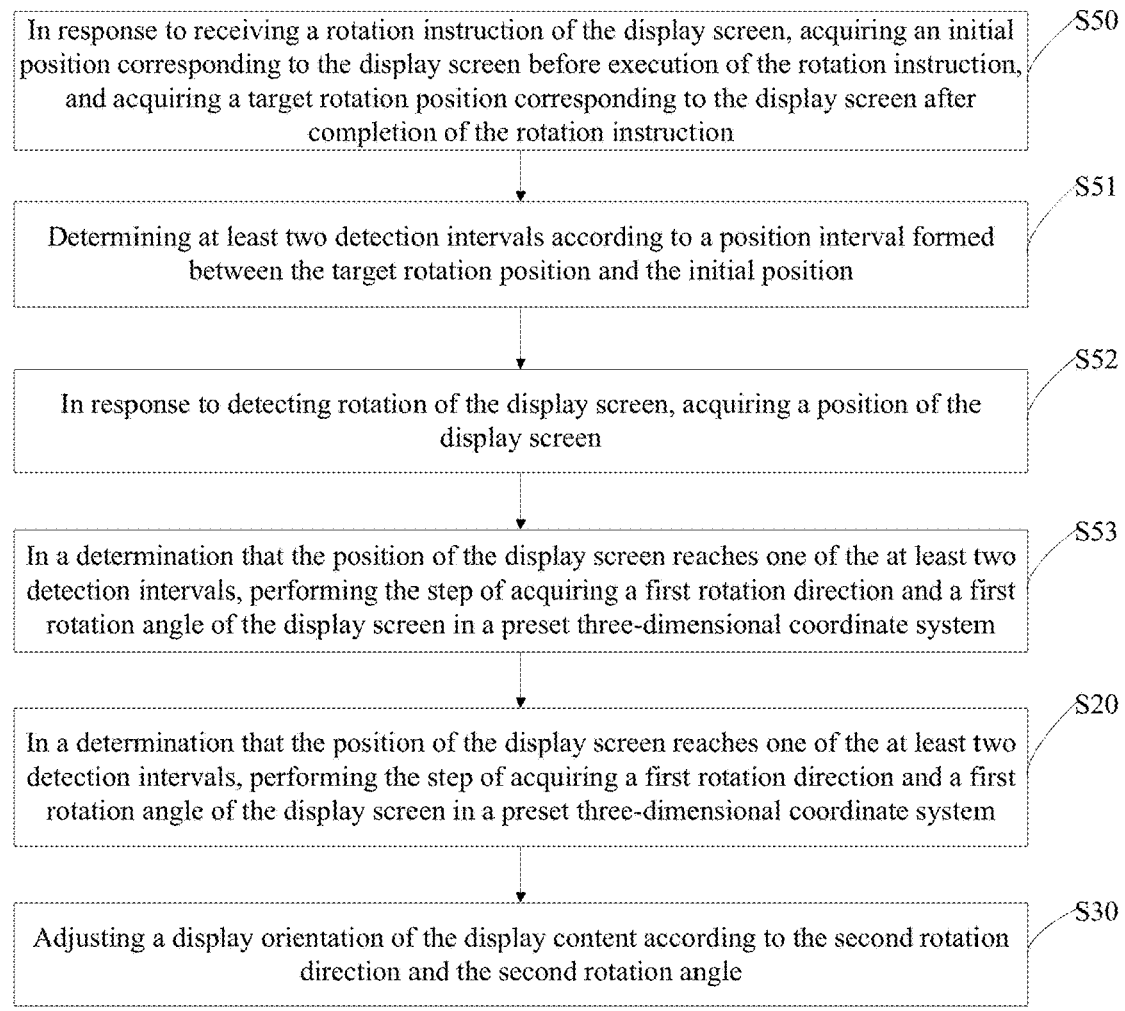
FIG. 4 is a flow chart of a third embodiment of the control method for the audio device according to this disclosure.

The realization of the objects, functional characteristics and advantages of this disclosure will be further described in conjunction with the embodiments and with reference to the drawings.

DETAILED DESCRIPTION OF THE EMBODIMENTS

It should be understood that the specific embodiments described herein are only used to explain this disclosure, and are not used to limit this disclosure.

This disclosure provides a control method for an audio device, the display orientation of the display content relative to the display screen is kept unchanged when the display screen of the audio device rotates, so that it is convenient for the user to watch the display content of the display screen.

As shown in FIG. 1, FIG. 1 is a schematic diagram of a hardware operating environment of a terminal according to an embodiment of this disclosure.

The terminal in this embodiment of this disclosure may be an audio device, or may be a server or a control terminal that controls the audio device.

Referring to FIG. 1, the terminal may include: a processor 1001, such as a Central Processing Unit (CPU), a memory 1002, and a communication bus 1003. The communication bus 1003 is configured to realize the connection and communication between the components in the terminal. The memory 1002 can be either a high-speed random-access memory (RAM) or a stable non-volatile memory, such as a disk memory. Optionally, the memory 1002 may be a storage device independent of the foregoing processor 1001.

Those skilled in the art may understand that the structure of the terminal shown in FIG. 1 does not constitute a limitation on the terminal, and more or less components than those illustrated may be included in the terminal, or certain components may be combined, or different components may be arranged.

As shown in FIG. 1, the memory 1002 as a computer-readable storage medium may include a control program for an audio device.

In the terminal shown in FIG. 1, the processor 1001 can be configured to call the control program for the audio device stored on the memory 1002 and perform the following steps:

in response to detecting rotation of the display screen, a first rotation direction and a first rotation angle of the display screen in a preset three-dimensional coordinate system are acquired;

determining a second rotation direction and a second rotation angle of display content on the display screen according to the first rotation direction and the first rotation angle, the first rotation direction is opposite to the second rotation direction, and a difference between the second rotation angle and the first rotation angle is less than or equal to a preset value; and adjusting a display orientation of the display content according to the second rotation direction and the second rotation angle.

Further, the processor 1001 can call the control program for the audio device stored on the memory 1002 to further perform the following steps:

determining a reference point of the display screen;

acquiring and taking a coordinate of the rotating shaft in the preset three-dimensional coordinate system as a first coordinate, acquiring and taking a coordinate of the reference point in the preset three-dimensional coordinate system before the display screen rotates as a second coordinate, and acquiring and taking a coordinate of the reference point in the preset three-dimensional coordinate system after the display screen rotates as a third coordinate; and taking a connection line between the first coordinate and the second coordinate as a first connection line, taking a connection line between the first coordinate and the third coordinate as a second connection line, and taking an included angle between the first connection line and the second connection line as the first rotation angle.

Further, the processor 1001 can call the control program for the audio device stored on the memory 1002 to further perform the following steps:

in response to detecting rotation of the display screen, determining the first rotation direction according to an offset direction of the second connection line relative to the first connection line.

Further, the processor 1001 can call the control program for the audio device stored on the memory 1002 to further perform the following steps:

in response to detecting rotation of the display screen, regularly performing the step of acquiring a first rotation direction and a first rotation angle of the display screen in a preset three-dimensional coordinate system.

Further, the processor 1001 can call the control program for the audio device stored on the memory 1002 to further perform the following steps:

in response to receiving a rotation instruction of the display screen, acquiring an initial position corresponding to the display screen before execution of the rotation instruction, and acquiring a target rotation position corresponding to the display screen after completion of the rotation instruction;

determining at least two detection intervals according to a position interval formed between the target rotation position and the initial position;

in response to detecting rotation of the display screen, acquiring a position of the display screen; and in a determination that the position of the display screen reaches one of the at least two detection intervals, performing the step of acquiring a first rotation direction and a first rotation angle of the display screen in a preset three-dimensional coordinate system.

Further, the processor 1001 can call the control program for the audio device stored on the memory 1002 to further perform the following steps:

the at least two detection intervals include a first detection interval, a second detection interval and a third detection interval, and the display screen is controlled to perform uniform acceleration rotation in the first detection interval, perform uniform rotation in the second detection interval, and perform uniform deceleration rotation in the third detection interval.

Further, the processor 1001 can call the control program for the audio device stored on the memory 1002 to further perform the following steps:

when performing the step of adjusting a display orientation of the display content according to the second rotation direction and the second rotation angle, controlling a display ratio of the display content on the display screen to remain unchanged.

Further, the processor 1001 can call the control program for the audio device stored on the memory 1002 to further perform the following steps:

a display interface of the display screen is a circular display interface.

Referring to FIG. 2, in an embodiment, the control method for the audio device includes:

S10. In response to detecting rotation of the display screen, acquiring a first rotation direction and a first rotation angle of the display screen in a preset three-dimensional coordinate system.

In this embodiment, the terminal may be an audio device, or may be a control terminal or a server of the audio device. The following is described by taking the embodiment terminal as an audio device as an example. It should be noted that the audio device can be a smart loudspeaker.

Figure 6:
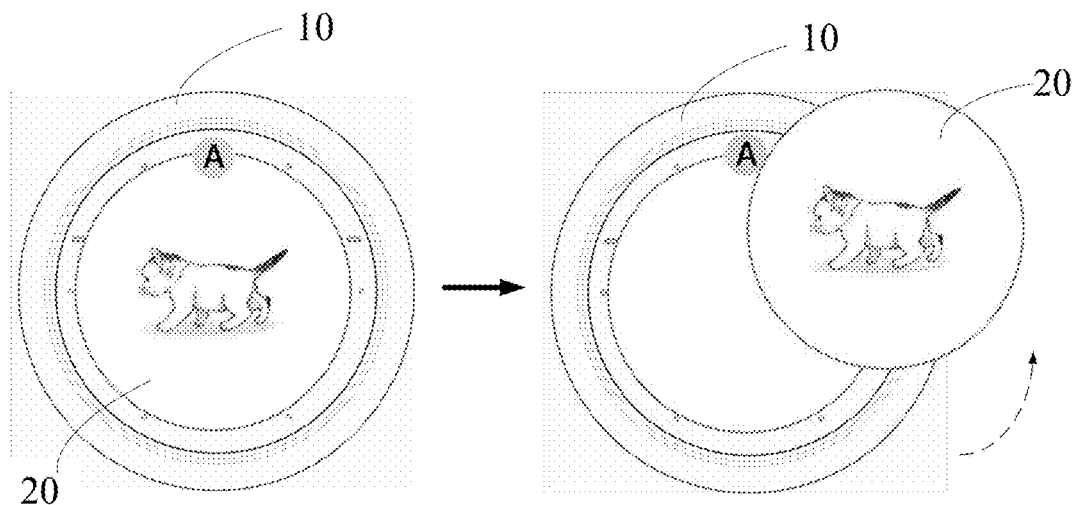
FIG. 6 is a schematic structural diagram of an audio device of a control method for an audio device according to an embodiment of this disclosure.

Optionally, the audio device is optional example structure 1: referring to FIG. 6, the audio device includes a playing component 10 and a display screen 20, the display screen 20 is connected to the playing component 10 through a rotating shaft A, and the display screen 20 can rotate eccentrically around the rotating shaft A. Further, the playback component 10 is provided with an accommodating area 11, and the accommodating area 11 can be configured to accommodate the display screen 20. Further, the display screen 20 can perform clockwise or counterclockwise eccentric rotation around the rotating shaft A relative to a plane where the accommodating area 11 is located.

Optionally, the audio device is optional example structure 2: based on the audio device optional example structure 1, the audio device may further include a bracket component (not shown in the figures) that is rotatably connected to the playing component, and the audio device may be smoothly placed on a supporting surface that is relatively flat with the horizontal plane through the bracket component. A rotating shaft B (not shown in the figures) is arranged between the playing component and the bracket component. The terminal can adjust relative positional relationship between the plane where the accommodating area of the playing component is located and the horizontal plane by controlling the playing component to rotate around the rotating shaft B, namely, the terminal can adjust an included angle between the plane where the accommodating area is located and the horizontal plane by rotating the rotating shaft B.

Figure 7:
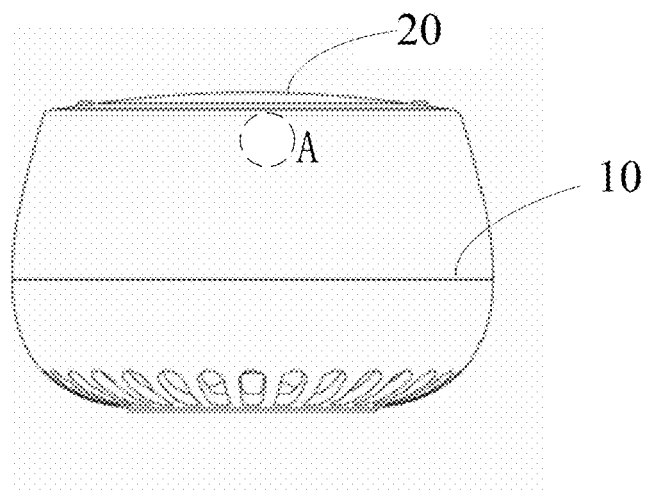
FIG. 7 is a schematic structural diagram of an audio device of a control method for an audio device according to another embodiment of this disclosure.
Figure 8:
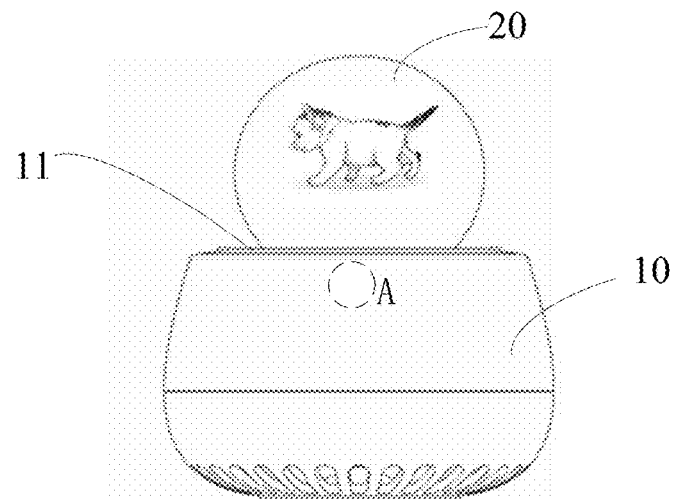
FIG. 8 is a front view of a display screen after rotation of the control method of the audio device according to another embodiment of this disclosure.
Figure 9:
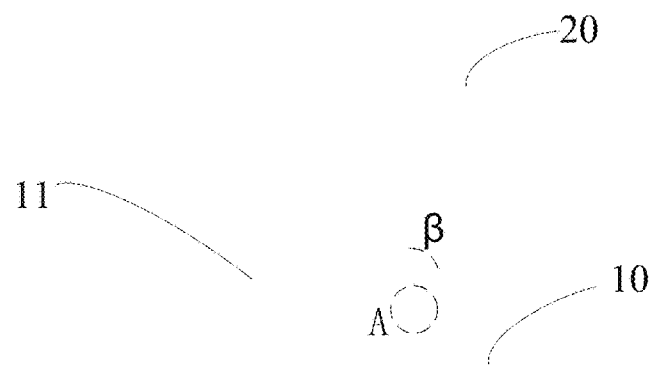
FIG. 9 is a side view of the display screen after rotation of the control method of the audio device according to another embodiment of this disclosure.
Figure 10:
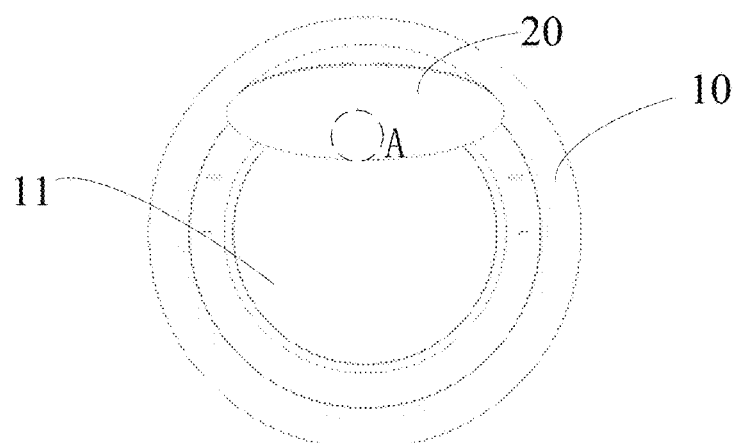
FIG. 10 is a top view of the display screen after rotation of the control method of the audio device according to another embodiment of this disclosure.

Optionally, the audio device is optional example structure 3: referring to FIGS. 7 to 9, the audio device includes a playing component 10 and a display screen 20, the display screen 20 is connected to the playing component 10 through a rotating shaft A, and the display screen 20 can rotate around the rotating shaft A. The playing component 10 is provided with an accommodating area 11, which is specifically an area formed by a concave spherical surface and can be configured to accommodate the display screen 20. As shown in FIG. 9, one side of the display screen 20 is a flat display part and the other side of the display screen 20 is a spherical shape, and the spherical shape is matched with an area formed by the concave accommodating area 11 so that the display screen 20 can be completely placed in the accommodating area 11. Optionally, when the audio device is smoothly placed on a supporting surface relatively flat with the horizontal plane through the playing component 10, a plane where the accommodating area 11 is located is relatively parallel with the horizontal plane, and when the display screen 20 is completely placed in the accommodating area 11, the display screen 20 is relatively parallel with the horizontal plane. Further, referring to FIGS. 8 to 10, the display screen 20 may perform an eccentric rotation movement clockwise or counterclockwise with respect to the concave sphere formed by the accommodation area 11 around the rotating shaft A. Further, as shown in FIG. 9, when the display screen 20 moves away from the accommodating area 11 by rotating around the rotating shaft A, a certain angle R is formed between the display screen 20 and the horizontal plane. When the display screen 20 is in a horizontal position, β is 0 degree, when the display screen 20 is rotated counterclockwise around the rotating shaft A from the horizontal position, β gradually increases from 0 degree until reaching a maximum angle, when the display screen 20 continues to be rotated counterclockwise around the rotating shaft A, the angle β gradually decreases from the maximum angle.

Optionally, the first rotation direction and the first rotation angle can be determined according to a control instruction issued by the user. The control instruction can be a voice instruction, a gesture instruction, a key instruction, or the user can directly manually control the display screen to a certain position. The control instruction can be in the above forms, but is not limited to these forms. For example, when the user sends a voice instruction "clockwise rotation 30 degrees", the first rotation angle is 30 degrees, and the first rotation direction is clockwise. After receiving the control instruction, the audio device controls the display screen to rotate the first rotation angle in the first rotation direction relative to the current position, that is, to rotate 30 degrees clockwise.

Optionally, a coordinate of the rotating shaft A in a preset three-dimensional coordinate system is acquired as a first coordinate. The terminal determines a reference point on the display screen in advance, and the reference point may be set as any point on the display screen. A coordinate of the reference point in the preset three-dimensional coordinate system before the display screen rotates is taken as a second coordinate, and a coordinate of the reference point in the preset three-dimensional coordinate system after the display screen rotates is taken as a third coordinate. A connection line between the first coordinate and the second coordinate is taken as a first connection line, a connection line between the first coordinate and the third coordinate is taken as a second connection line, and an included angle between the first connection line and the second connection line is taken as a first rotation angle of the display screen in the preset three-dimensional coordinate system.

Optionally, the display screen is provided with a gravity sensor, and when the display screen enters the rotating state, the terminal can obtain the first rotation direction of the display screen in the preset three-dimensional coordinate system. Certainly, the first rotation direction may also be determined according to an offset direction of the second connection line with respect to the first connection line.

Figure 11:
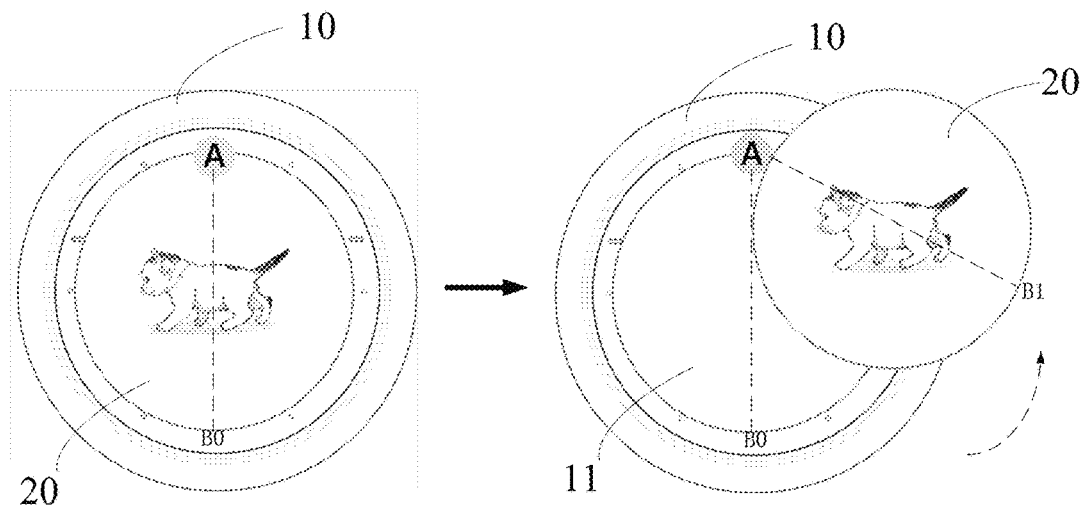
FIG. 11 is an example diagram of a rotation process of the display screen of the control method of the audio device according to an embodiment of this disclosure.
Figure 12:
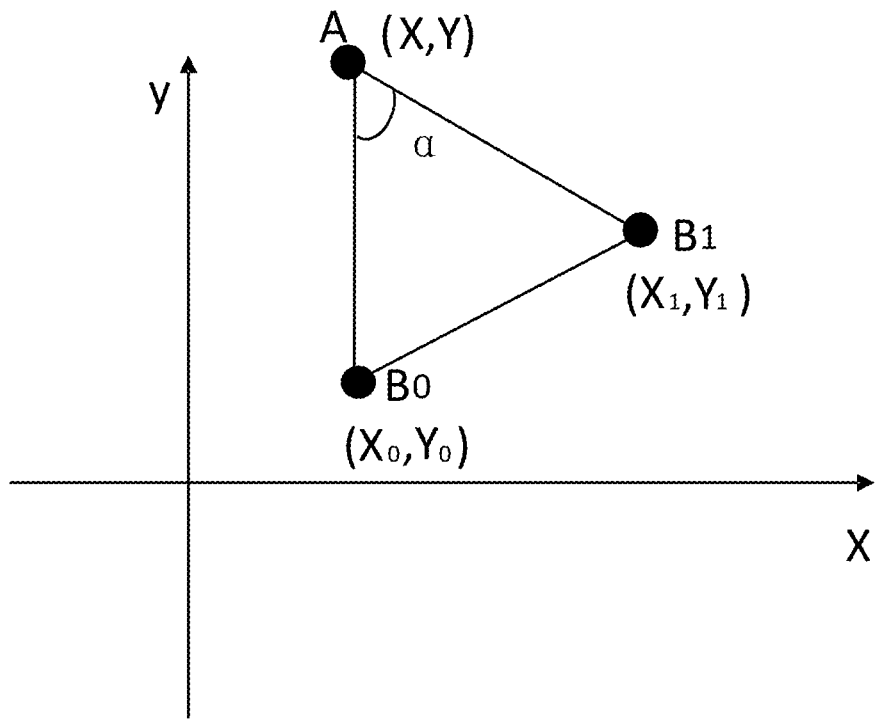
FIG. 12 is an example of a plane rectangular coordinate system for the control method of the audio device according to an embodiment of this disclosure.

Optionally, taking a rotation plane of the display screen being parallel to the plane where the accommodating area 11 is located as an example for description. Referring to FIG. 11, the coordinate of the rotating shaft A in the preset three-dimensional coordinate system is taken as the first coordinate. Any reference point B in the display screen is selected, the second coordinate of the reference point B before the display screen rotates is recorded as B0. A connection line between the second coordinate B0 and the first coordinate corresponding to the rotating shaft A is taken as a first connection line AB0. When the display screen rotates and the position of reference point B is updated to a second position B1, a coordinate corresponding to the second position B1 is taken as a third coordinate, and a connection line between the first coordinate corresponding to the rotating shaft A and the third coordinate corresponding to B1 is a second connection line AB1. Referring to FIG. 12, since the display screen rotates in a plane, a plane rectangular coordinate system is constructed in the rotation plane. At this time, the preset three-dimensional coordinate system is a plane rectangular coordinate system. The coordinate of the rotating shaft A is recorded as (x, y), the coordinate of the first position B0 is recorded as the second coordinate (x0, y0), and the coordinate of the second position B1 is recorded as the third coordinate (x1, y1). Then an included angle α between the first connection line AB0 and the second connection line AB1 can be calculated according to the first coordinate (x, y), the second coordinate (x0, y0), and the third coordinate (x1, y1), and the included angle α is recorded as the first rotation angle. A direction of the second connection line AB1 relative to the first connection line AB0 is the first rotation direction.

Figure 13:
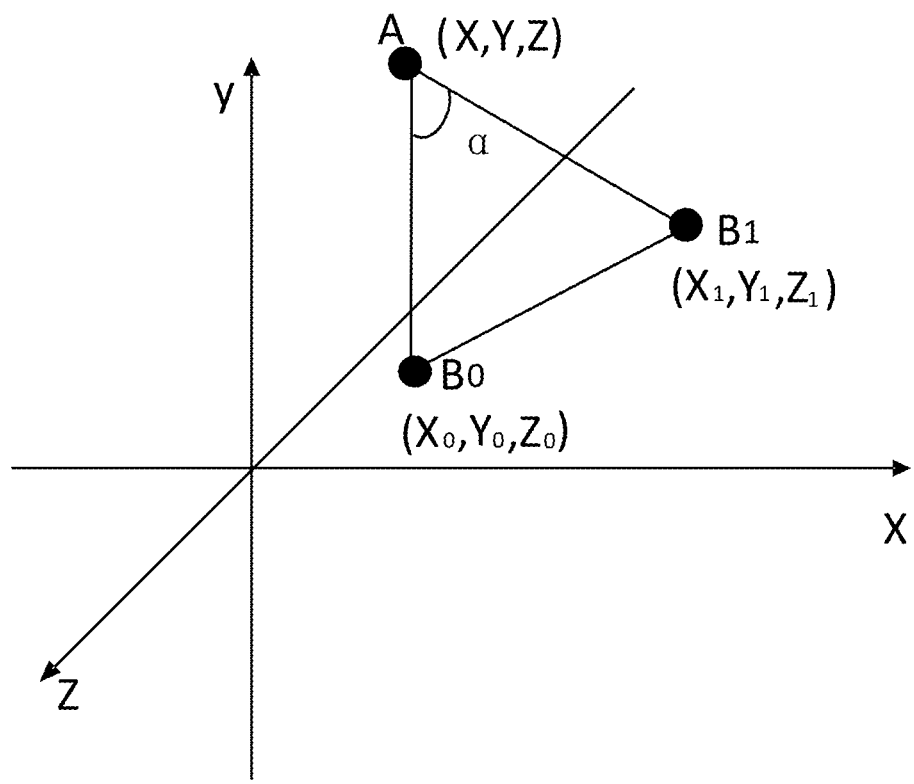
FIG. 13 is an example of a three-dimensional spatial coordinate system for the control method of the audio device according to an embodiment of this disclosure.

Optionally, referring to FIG. 13, when the rotation plane of the display screen is not a plane, a preset three-dimensional coordinate system is constructed. Similarly, the rotating shaft A is selected as the reference point, and its coordinate is recorded as the first coordinate. Any reference point B in the display screen is selected, a first position of the reference point B before the display screen rotates is recorded as B0, its coordinate is recorded as the second coordinate, and a connection line between the first coordinate and the second coordinate is taken as a first connection line AB0. When the display screen rotates and the position of the reference point B is updated to a second position B1, the second position B1 corresponds to a third coordinate, and a connection line between the first coordinate and the third coordinate is a second connection line AB1. The first coordinate is recorded as (x, y, z), the coordinate of the first position B0 is recorded as (x0, y0, z0), and the coordinate of the second position B1 is recorded as (x1, y1, z1). An included angle α between the first connection line AB0 and the second connection line AB1 can be calculated according to the first coordinate (x, y, z), the second coordinate (x0, y0, z0) and the third coordinate (x1, y1, z1), and the included angle α is recorded as the first rotation angle. A direction of the second connection line AB1 relative to the first connection line AB0 is the first rotation direction.

S20. Determining a second rotation direction and a second rotation angle of display content on the display screen according to the first rotation direction and the first rotation angle, the first rotation direction is opposite to the second rotation direction, and a difference between the second rotation angle and the first rotation angle is less than or equal to a preset value.

S30. Adjusting a display orientation of the display content according to the second rotation direction and the second rotation angle.

Optionally, after determining that the first rotation direction of the display screen in the preset three-dimensional coordinate system is obtained, the terminal acquires a direction opposite to the first rotation direction in the preset three-dimensional coordinate system as the second rotation direction.

Optionally, after obtaining the first rotation angle of the display screen in the preset three-dimensional coordinate system, the terminal acquires the second rotation angle according to the first rotation angle. Optionally, the second rotation angle is equal to the first rotation angle. Optionally, there may be a certain deviation value between the second rotation angle and the first rotation angle, that is, a difference between the second rotation angle and the first rotation angle is less than or equal to a preset value, and a value range of the preset value can be 0°-5°.

Optionally, after determining the second rotation direction and the second rotation angle, the terminal can adjust the display orientation of the display content on the display screen according to the second rotation direction and the second rotation angle, control the display content to rotate on the plane where the display screen is located, and perform rotation compensation of the display orientation, so that when the display screen rotates, the display orientation of the display content is still positively displayed in front of the user, that is, the line of sight of the user when displaying the content in a head-up view and the positive display orientation of the display content can still remain relatively flat.

Optionally, when the display screen rotates in the same plane, the terminal can directly control the display orientation of the display content to rotate in the second rotation direction, which is equivalent to that the plane where the display screen is located rotates the second rotation angle, so as to adjust the display orientation of the display content according to the second rotation direction and the second rotation angle.

Optionally, when the display screen rotates not in the same plane but in the three-dimensional space, the first rotation angle is calculated according to the preset three-dimensional space coordinate system, and the corresponding second rotation angle is also obtained in the preset three-dimensional space. Then the terminal controls the display orientation of the display content to rotate the second rotation angle in the second rotation direction opposite to the first rotation direction to adjust the display orientation of the display content.

In an embodiment, in response to detecting rotation of the display screen, a first rotation direction and a first rotation angle of the display screen in a preset three-dimensional coordinate system are acquired; a second rotation direction and a second rotation angle of display content on the display screen are determined according to the first rotation direction and the first rotation angle, the first rotation direction is opposite to the second rotation direction, and a difference between the second rotation angle and the first rotation angle is less than or equal to a preset value; and a display orientation of the display content is adjusted according to the second rotation direction and the second rotation angle. In this way, the display orientation of the display content is kept unchanged when the display screen of the audio device rotates, so that it is convenient for the user to watch the display content of the display screen.

In a second embodiment, as shown in FIG. 3, on the basis of the embodiment of FIG. 2 above, the control method for the audio device further includes:

S40. In response to detecting rotation of the display screen, regularly performing the step of acquiring a first rotation direction and a first rotation angle of the display screen in a preset three-dimensional coordinate system.

In this embodiment, when detecting a rotation instruction of the display screen, the terminal acquires a target rotation position of the display screen indicated by the rotation instruction. In a process of controlling the display screen to rotate from an initial position of the display screen to the target rotation position, the terminal regularly performs the step of acquiring a first rotation direction and a first rotation angle of the display screen in a preset three-dimensional coordinate system, so as to adjust the display orientation of the display content according to the second rotation direction and the second rotation angle for a plurality of times. In this way, from the viewing angle of the user, the display orientation of the display content can be basically kept unchanged, so as to avoid the user losing the focus of the display image when watching.

Figure 14:
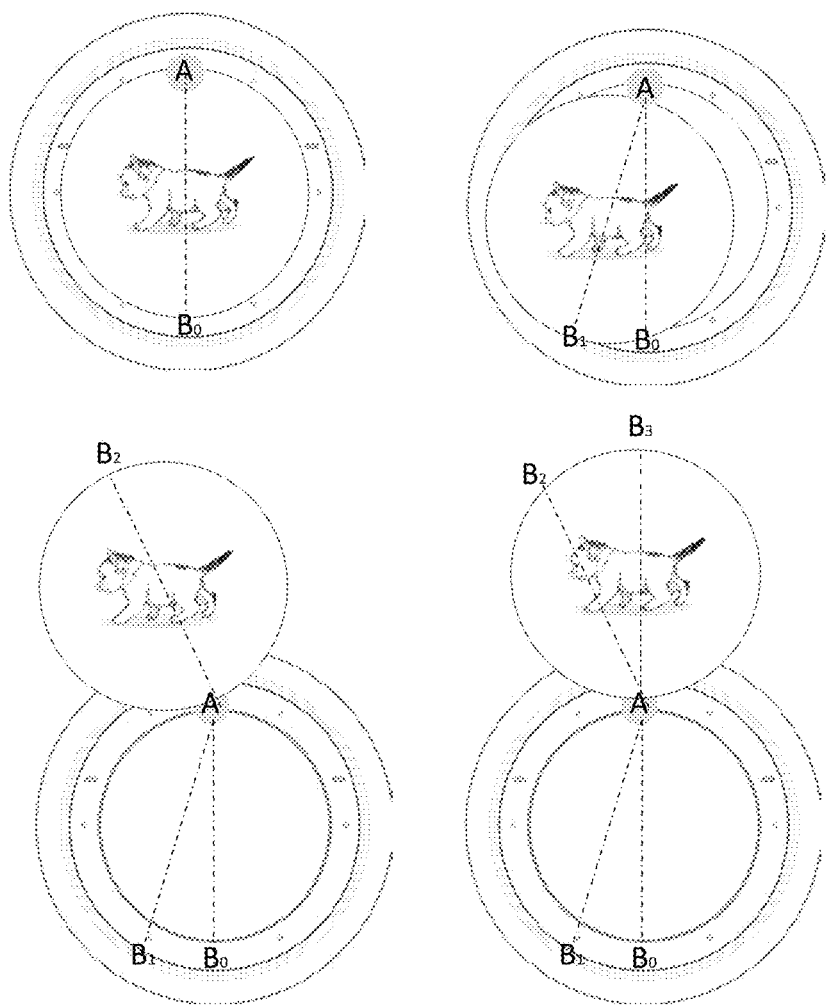
FIG. 14 is an example diagram of a rotation process of the display screen of the control method of the audio device according to another embodiment of this disclosure.

It should be noted that, referring to FIG. 14, in the process of controlling the display screen to rotate to the target rotation position, the more times the step of acquiring a first rotation direction and a first rotation angle of the display screen in a preset three-dimensional coordinate system is performed (that is, the more times the display orientation of the display content is adjusted), the better the viewing experience of the user. Therefore, a value range of a time of regularly performing can be 0.04 s-60 s.

Optionally, the value of the time of regularly performing can be equal to a playing time of each frame of video, that is, 0.04 s, so that the adjustment process of the display orientation of the display content can be matched with the user's best viewing experience.

In a third embodiment, as shown in FIG. 4, on the basis of the embodiments of FIGS. 2 to 3 above, the control method for the audio device further includes:

S50. In response to receiving a rotation instruction of the display screen, acquiring an initial position corresponding to the display screen before execution of the rotation instruction, and acquiring a target rotation position corresponding to the display screen after completion of the rotation instruction.

S51. Determining at least two detection intervals according to a position interval formed between the target rotation position and the initial position.

S52. In response to detecting rotation of the display screen, acquiring a position of the display screen.

S53. In a determination that the position of the display screen reaches one of the at least two detection intervals, performing the step of acquiring a first rotation direction and a first rotation angle of the display screen in a preset three-dimensional coordinate system.

In this embodiment, when detecting a rotation instruction of the display screen, the terminal acquires a target rotation position of the display screen indicated by the rotation instruction, and then divides at least two detection intervals between the initial position and the target rotation position according to a distance between the initial position before the display screen rotates and the target rotation position.

Optionally, when the display screen rotates, the terminal acquires the position of the display screen in real time or at regular intervals, and performs the step of acquiring a first rotation direction and a first rotation angle of the display screen in a preset three-dimensional coordinate system once when the position of the display screen is detected to reach a detection interval. In this way, the more division of detection intervals, the better the user's viewing experience.

Figure 15:
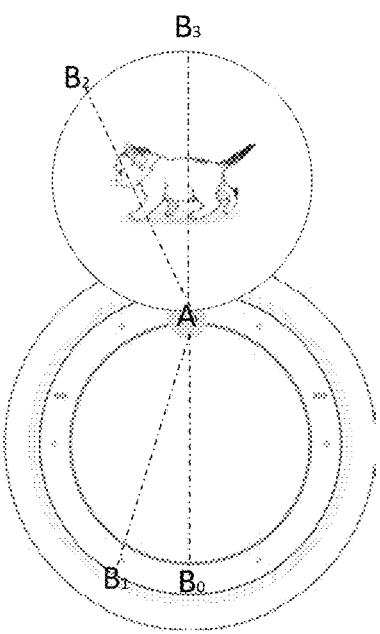
FIG. 15 is a schematic diagram of a detection interval according to an embodiment of the control method for the audio device of this disclosure.

Optionally, referring to FIG. 15, the terminal divides three detection intervals between the initial position and the target rotation position, including a first detection interval $B_0B_1$, a second detection interval $B_1B_2$, and a third detection interval $B_2B_3$. An initial position of the first detection interval is the initial position of the display screen, an end position of the third detection interval is the target rotation position of the display screen, and the second detection interval is between the first detection interval and the third detection interval. Further, when the position of the display screen is in the first detection interval, the terminal controls the display screen to start to perform uniform acceleration rotation at a speed of 0; when the position of the display screen is in the second detection interval, the terminal controls the display screen to perform uniform rotation at a maximum rotation speed reached in the first detection interval; and when the position of the display screen is in the third detection interval, the terminal controls the display screen to perform uniform deceleration rotation, so that the rotation speed is just 0 when the display screen rotates to the target position. In this way, the stability of the display screen during rotation can be improved. Further, in each detection interval, the terminal performs the step of acquiring a first rotation direction and a first rotation angle of the display screen in a preset three-dimensional coordinate system at least once, so that in each detection interval, the more times the display orientation of the display content is adjusted, the better the viewing experience of the user is.

In this way, by adjusting the display orientation of the display content multiple times during the rotation of the display screen, from the perspective of the user's viewing, the display orientation of the display content can be basically kept unchanged, and the user is prevented from losing the focus of the display image when watching.

Figure 5:
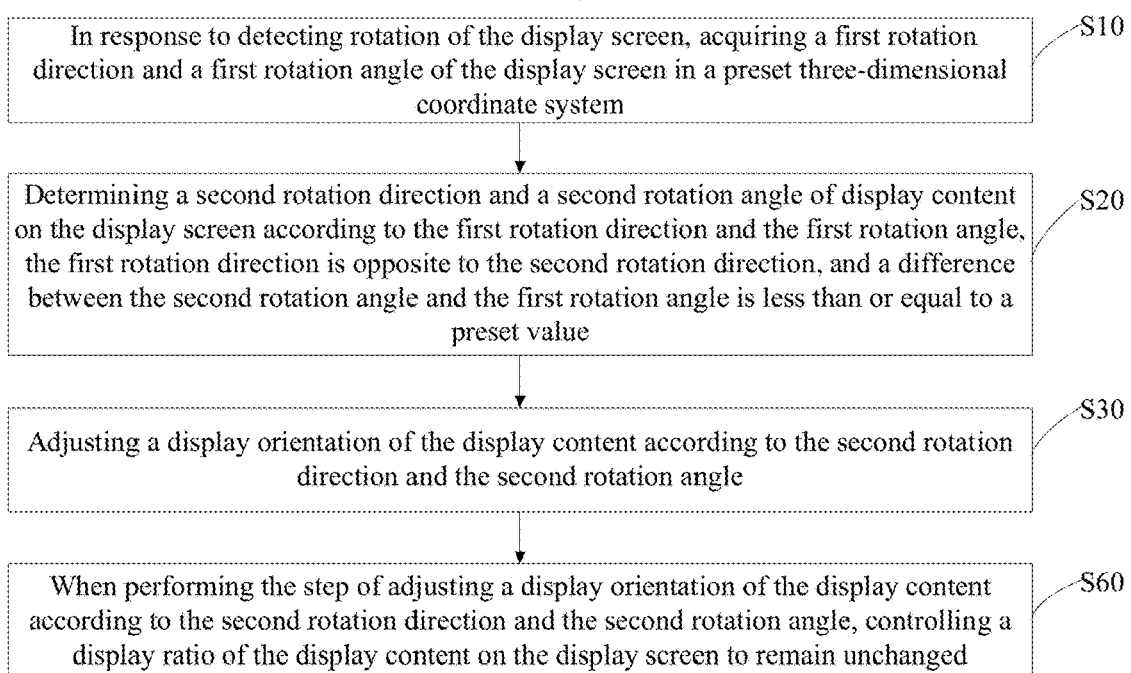
FIG. 5 is a flow chart of a fourth embodiment of the control method for the audio device according to this disclosure.

In a fourth embodiment, as shown in FIG. 5, on the basis of the embodiments of FIGS. 2 to 4 above, the control method for the audio device further includes:

S60. When performing the step of adjusting a display orientation of the display content according to the second rotation direction and the second rotation angle, controlling a display ratio of the display content on the display screen to remain unchanged.

In this embodiment, the display area of the display content displayed on the display screen is an equilateral area or a circular area.

Optionally, the terminal pre-records a current display ratio of the display content on the display screen, and when adjusting the display orientation of the display content according to the second rotation direction and the second rotation angle, the terminal controls the display content of the display screen to continue to be displayed at the current display ratio.

Optionally, a display interface of the display screen is a circular interface, so that no matter how the display content is rotated and adjusted relative to the display screen, the terminal can control the display ratio of the display content on the display screen to remain unchanged. Further, an overall structure of the display screen is also a circular structure, that is, the display screen is a circular display screen.

Optionally, when the display interface of the display screen is not a circular interface, the display interval of the display content must not be covered with the display interface of the display, so that it is ensured that the display ratio of the display content remains unchanged when adjusting the display orientation of the display content according to the second rotation direction and the second rotation angle.

In this way, in the process of adjusting the display orientation of the display content, the display ratio of the display content on the display screen is controlled to remain unchanged, so that the user does not need to adapt to the new display ratio again, thereby improving the user's viewing experience of the display content.

In addition, this disclosure further provides an audio device, the audio device includes a playing component and a display screen rotatably connected to the playing component. The audio device includes a memory, a processor, and a control program for the audio device stored on the memory and operable on the processor, and when the control program for the audio device is executed by the processor, the steps of the control method for the audio device as described in the above embodiments are implemented.

In addition, this disclosure further provides a computer-readable storage medium, which includes a control program for an audio device, and when the control program for the audio device is executed by a processor, the steps of the control method for the audio device as described in the above embodiments are implemented.

The sequence numbers of the above embodiments of this disclosure are for description only, and do not represent the advantages and disadvantages of the embodiments.

Through the description of the above embodiments, those skilled in the art can clearly understand that the methods in the above embodiments can be implemented by means of software plus a necessary general hardware platform, and of course, can also be implemented by hardware, but in many cases the former is optional. Based on this understanding, the technical solution of this disclosure can be embodied in the form of a software product in essence or part that contributes to the prior art, and the computer software product is stored in a storage medium (such as ROM/RAM, magnetic disk, optical disk as described above), including several instructions to make a terminal apparatus (which can be a television, mobile phone, computer, server, controlled terminal, or network equipment, etc.) to implement the method described in each embodiment of this disclosure.

The above are only preferred embodiments of this disclosure and do not limit the scope of this disclosure. Any equivalent structure or equivalent process transformation made by the description and drawings of this disclosure, or directly or indirectly used in other related technical fields are similarly included in the patent protection scope of this disclosure.

What is claimed is:

1. A control method for an audio device, wherein the audio device comprises a playing component and a display screen rotatably connected to the playing component, and the control method for the audio device comprises the following steps:
   in response to detecting rotation of the display screen, acquiring a first rotation direction and a first rotation angle of the display screen in a preset three-dimensional coordinate system;
   determining a second rotation direction and a second rotation angle of display content on the display screen according to the first rotation direction and the first rotation angle, wherein the first rotation direction is opposite to the second rotation direction, and a difference between the second rotation angle and the first rotation angle is less than or equal to a preset value;
   adjusting a display orientation of the display content according to the second rotation direction and the second rotation angle;
   in response to receiving a rotation instruction of the display screen, acquiring an initial position corresponding to the display screen before execution of the rotation instruction, and acquiring a target rotation position corresponding to the display screen after completion of the rotation instruction;
   determining at least two detection intervals by dividing a distance between the target rotation position and the initial position into two or more intervals;

in response to detecting rotation of the display screen, acquiring a position of the display screen; and in a determination that the position of the display screen reaches one of the at least two detection intervals, performing the step of acquiring a first rotation direction and a first rotation angle of the display screen in a preset three-dimensional coordinate system.

2. The control method for the audio device of claim 1, wherein the playing component is rotatably connected to the display screen through a rotating shaft, and before the step of in response to detecting rotation of the display screen, acquiring a first rotation direction and a first rotation angle of the display screen in a preset three-dimensional coordinate system, the control method for the audio device further comprises:

determining a reference point of the display screen;

wherein, acquiring and taking a coordinate of the rotating shaft in the preset three-dimensional coordinate system as a first coordinate, acquiring and taking a coordinate of the reference point in the preset three-dimensional coordinate system before the display screen rotates as a second coordinate, and acquiring and taking a coordinate of the reference point in the preset three-dimensional coordinate system after the display screen rotates as a third coordinate; and taking a connection line between the first coordinate and the second coordinate as a first connection line, taking a connection line between the first coordinate and the third coordinate as a second connection line, and taking an included angle between the first connection line and the second connection line as the first rotation angle.

3. The control method for the audio device of claim 2, further comprising:

in response to detecting rotation of the display screen, determining the first rotation direction according to an offset direction of the second connection line relative to the first connection line.

4. The control method for the audio device of claim 3, further comprising:

in response to detecting rotation of the display screen, regularly performing the step of acquiring a first rotation direction and a first rotation angle of the display screen in a preset three-dimensional coordinate system.

5. The control method for the audio device of claim 2, further comprising:

in response to detecting rotation of the display screen, regularly performing the step of acquiring a first rotation direction and a first rotation angle of the display screen in a preset three-dimensional coordinate system.

6. The control method for the audio device of claim 1, further comprising:

in response to detecting rotation of the display screen, regularly performing the step of acquiring a first rotation direction and a first rotation angle of the display screen in a preset three-dimensional coordinate system.

7. The control method for the audio device of claim 1, wherein the at least two detection intervals comprise a first detection interval, a second detection interval and a third detection interval, wherein the display screen is controlled to perform uniform acceleration rotation in the first detection interval, perform uniform rotation in the second detection interval, and perform uniform deceleration rotation in the third detection interval.

8. The control method for the audio device of claim 1, wherein when performing the step of adjusting a display orientation of the display content according to the second rotation direction and the second rotation angle, controlling a display ratio of the display content on the display screen to remain unchanged.

9. The control method for the audio device of claim 8, wherein a display interface of the display screen is a circular display interface.

10. An audio device, comprising a playing component and a display screen rotatably connected to the playing component, wherein the audio device comprises a memory, a processor, and a control program for the audio device stored on the memory and operable on the processor, and when the control program for the audio device is executed by the processor, the steps of the control method for the audio device as recited in claim 1 are implemented.

11. A non-transitory computer-readable storage medium, wherein a control program for an audio device is stored on the non-transitory computer-readable storage medium, and when the control program for the audio device is executed by a processor, the steps of the control method for the audio device as recited in claim 1 are implemented.

* * * * *